Oct. 26, 1971    R. B. BOLTON    3,615,002
SCRAPER-CHAIN CONVEYORS

Filed March 25, 1969    3 Sheets-Sheet 1

INVENTOR
ROBERT BENJAMIN BOLTON
By Jacobs & Jacobs

Oct. 26, 1971        R. B. BOLTON        3,615,002
SCRAPER-CHAIN CONVEYORS
Filed March 25, 1969        3 Sheets-Sheet 2
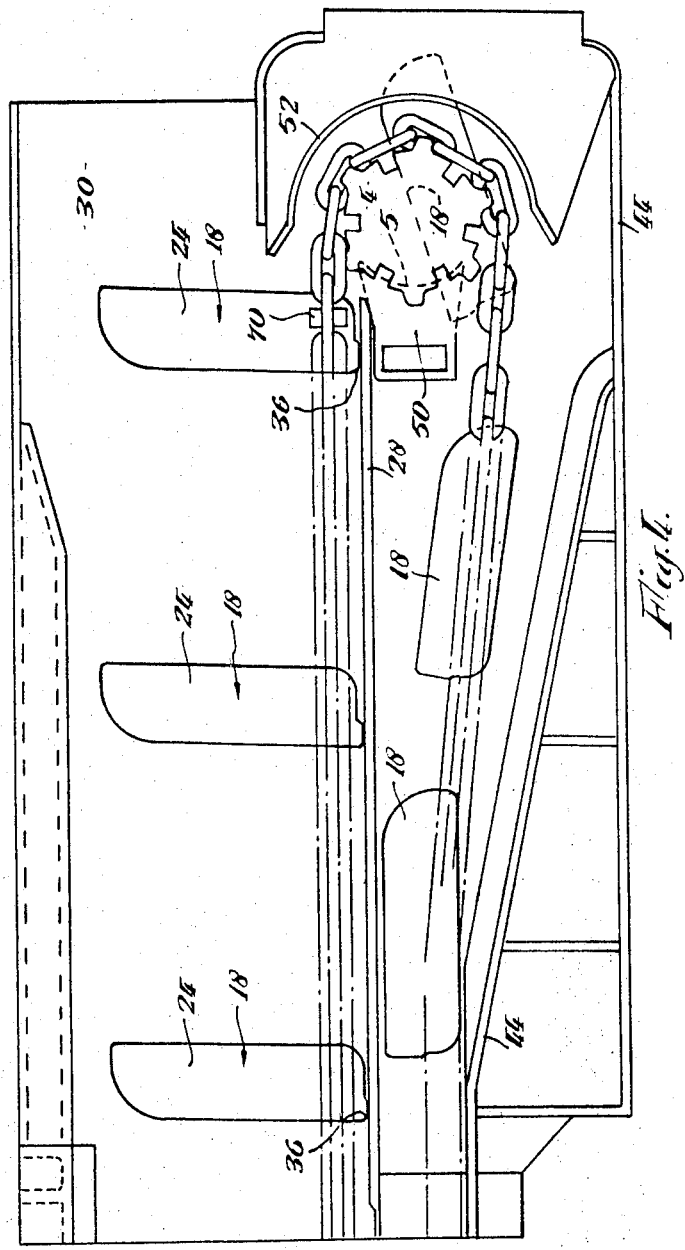

Oct. 26, 1971 R. B. BOLTON 3,615,002
SCRAPER-CHAIN CONVEYORS
Filed March 25, 1969 3 Sheets-Sheet 3
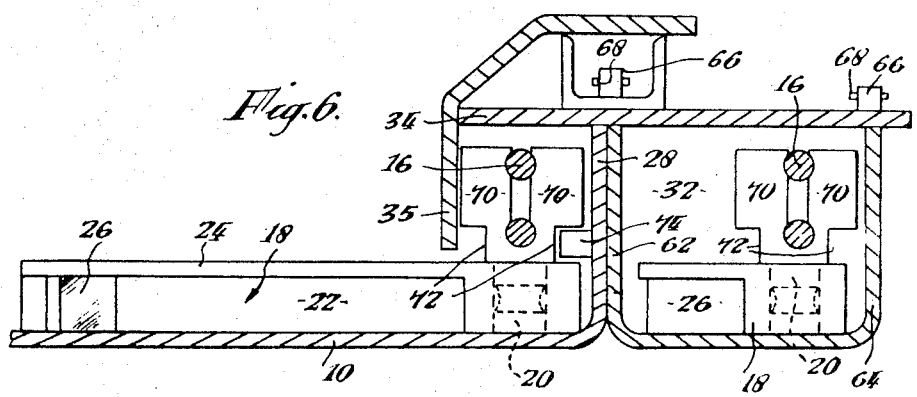
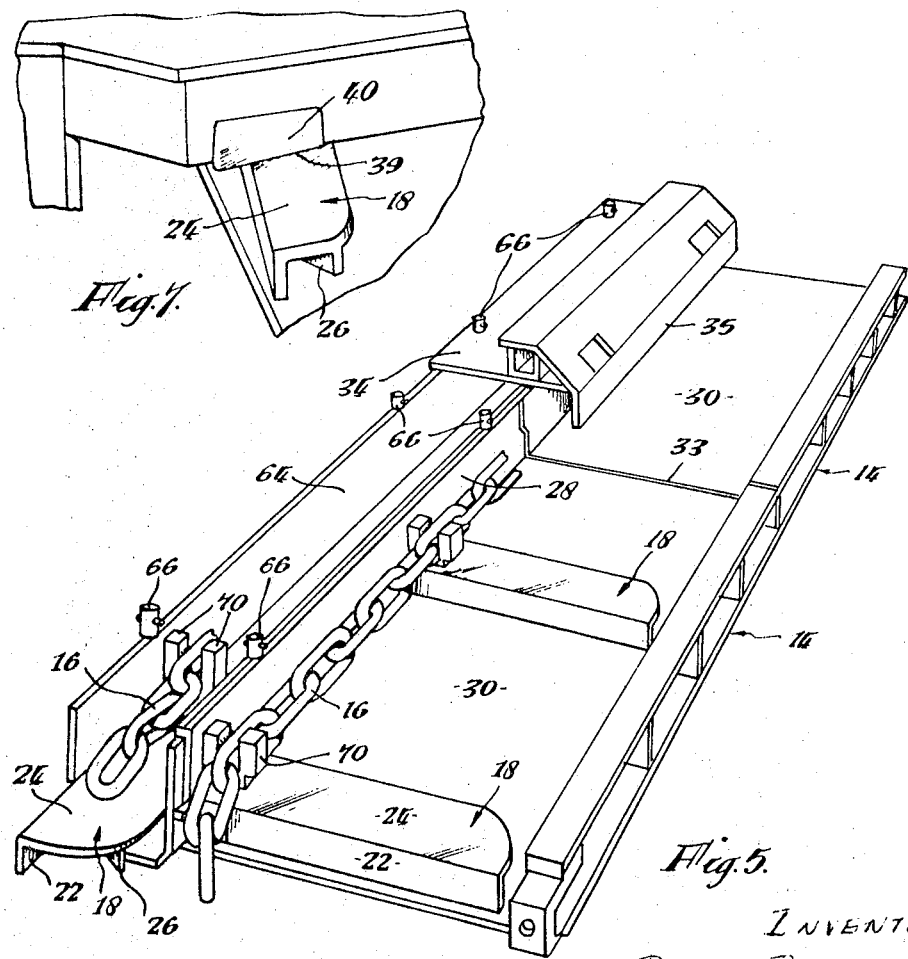
INVENTOR
ROBERT BENJAMIN BOLTON
BY Jacob&Jacobs United States Patent Office 3,615,002
Patented Oct. 26, 1971

3,615,002
SCRAPER-CHAIN CONVEYORS
Robert B. Bolton, 14 Middle Drive,
Ponteland Northumberland, England
Continuation-in-part of application Ser. No. 657,883,
Aug. 2, 1967. This application Mar. 25, 1969,
Ser. No. 810,095
Claims priority, application Australia, Mar. 27, 1968,
35,634/68
Int. Cl. B65g 19/04
U.S. Cl. 198—170      4 Claims

ABSTRACT OF THE DISCLOSURE

A scraper chain conveyor of the single chain type has a trough to receive the material being conveyed, an endless chain passing round end sprockets, one run of which extends along one side of the trough, and a series of pivoted flights spaced along the chain, which flights are maintained transversely to the trough throughout the driving run, and assume a trailing attitude relative to their pivots during the return run.

CROSS REFERENCE TO RELATED APPLICATION

This application is a continuation-in-part of applicant's co-pending application Ser. No. 657,883 filed Aug. 2, 1967, now Pat. No. 3,472,556 and entitled "Improvements in Scraper Chain Conveyors."

The problem caused by the chain carrying round some of the material being conveyed into the return run is minimised by pivoting the flights to pivot pins on the chain and extending downwardly therefrom. At the same time, the similar problem caused by the flights themselves carrying round the material as they pass from the driving run into the return run can be reduced by supporting the sprocket at the delivery end of the conveyor in such a way as to leave a clear space underneath for the passage of the flights, and allowing the flights to rotate freely about their pivot pins at the completion of each driving run, so that each flight is withdrawn sideways by the pivot pin away from the material being delivered by the conveyor and passes under the sprocket.

The driving run of the chain is preferably accommodated in a side region of the trough having a cover and a downwardly extending side wall. Wear between the chain and the side wall of the trough (and the side wall of the cover, if provided) can be reduced by providing each link of the chain pivotally attached to a flight with a bearing lug of wear-resistant material.

BACKGROUND OF THE INVENTION

Field of the invention

This invention relates to scraper chain conveyors where the material being moved is loaded on to a trough along which run a series of conveyor flights which move the material from the loading point to the delivery end of the conveyor. The flights are returned to the tail end or return end (in this specification designated the return end) of the conveyor where they start once more their driving run along the surface of the trough.

Description of the prior art

Conveyors of this type may have the flights attached to a single chain at one side of the driving run of the conveyor, each flight extending out in cantilever fashion to convey the material along the trough or the flights may be attached at each side to a chain so that there are two chains running along the two edges of the trough.

At the present time conveyors are usually of the two-chain type. It will be appreciated that with the two-chain conveyor there must be a sprocket wheel for each chain at each end of the conveyor to carry the return run back underneath the driving run so that the flights go back to the return end of the conveyor underneath the trough for the driving run. This form of conveyor has two main disadvantages. Firstly, the trough is necessarily raised above the surface of the ground since space has to be left for the return run of the conveyor underneath it, which means that if any of the material to be conveyed has to be lifted off the ground surface onto the conveyor, there is a substantial distance through which this material must be raised. With the single-chain conveyor on the other hand the trough can be almost at ground level. The second inconvenience of the two-chain conveyor is that there is the tendency for some of the material being conveyed to be carried back into the return run of the conveyor and so to be discharged at the return end. This is very disadvantageous for the following reasons:

(a) The conveyor motor is doing unnecessary work.
(b) There are disposal problems for the returned material.
(c) Lumps of hard material brought back on the return run may damage the conveyor, as the return run is working in a confined space.
(d) If the conveyor is allowed to rest for a period with certain types of material in the return run, this material may become hard and cause an excessive load on the engine on re-starting, as well as possible injury to the sprockets round which the chains pass.

The problem of the flow of the material into the return run may be caused in the case of the two-chain conveyor by material passing through cracks between the sections of trough or through material adhering to flights and being swept backwards into the return run.

For my improved conveyor I utilize the single-chain principle, and in particular I use the type of single-chain conveyor in which the flights are rotated about pivots to assume a trailing attitude during the return run, this arrangement allowing the return run to be constituted by a comparatively narrow channel which is preferably enclosed by a protective housing. However, with the single-chain conveyor as with the two-chain conveyor, there is normally the same difficulty that material tends to be taken back into the return run. The material brought back into the return run originates, I believe, from two sources. Firstly, the chain usually runs on a ledge of its own above or below the trough, or on the surface of the trough itself. In each such case any of the material which gets into the links of the chain remains in these links and may be shaken out on passing out around the sprockets or carried back into the return run. Secondly, the design of the single chain conveyor is almost invariably such that the flights at the end of the driving run sweep round the driving sprocket taking up a radial position, or substantially a radial position. The result of this is that there is a tendency for the flights to carry round the material being conveyed with them as they sweep round the driving sprocket and are taken back into the return run.

One attempt has been made to avoid material being carried round by the flights which involved forming an upstanding plate at the front of the flight and scraping this plate against a vertical scraper at the end of the driving run. There is however some difficulty in arranging for the front of the flight to be held against a scraper plate as it is pulled past it, without causing undue wear on the parts or load on the driving motor. Furthermore, there are considerable design problems in making flights with a large upstanding plate at the front. I have found that it is far more efficient to have rather low flights, so that if the conveyor is at any particular period having to deal with a large bulk of material, there is not on this account a vastly increased load on each flight and on the driving motor. The provision of low flights however exacerbates the problem of carrying round material into the return run, since, if the loading is high, the flights will be more or less running in a continuous stream of the material being conveyed, so that there is even more tendency for the front of the flights to swing this material round with it and entrain it into the return run.

It is an object of the present invention to provide an efficient one-chain conveyor and particularly to obviate as far as possible the difficulty of returning the material being conveyed into the return run from the chain and front face of the flights.

A further object of the invention is to reduce wear which may occur between the chain of a one-chain conveyor and any side wall with which it may be liable to come into contact.

Further objects and advantages will be apparent from the following description of the invention and a preferred embodiment thereof.

SUMMARY OF THE INVENTION

According to the present invention the flight pivot pins on the chain extend downwardly therefrom, so that the flights are pivoted directly under the chain and the chain is supported above the flights. Thus, if, as is inevitable, some of the material is thown up against the chain, this has the chance to drop down again into the conveying run. To some extent the material may be kept away from the chain by having the driving run of the chain accommodated in a side region of the trough having a cover and a downwardly extending side wall lying between the main region of the trough and the chain. Even with this arrangement it is almost certain that some of the material will pass underneath the side wall and so make contact with the chain. Especially if such a cover and side wall is provided, there may be problems of wear between the chain and this side wall, as well as between the chain and the side wall of the trough adjacent to it. This problem may be overcome by the use of bearing lugs of wear-resistant material provided on the links of chain pivotally attached to the flights.

My way of preventing, or at least minimising the quantity of, material being carried round the delivery end sprocket by the flights, even if the flights are moving in a heap of the material, is to arrange for each flight to be withdrawn sideways away from this material by its pivot pin. During the driving run of the flights a trailing portion at the end which is mounted on the pivot pin bears against a wall of the trough so as to maintain the flight transversely to the trough during the driving run of the chain. At the delivery end, the flights are allowed to rotate freely about the pivot pins, so that as each pivot pin passes round the sprocket it pulls the flight after it underneath the sprocket which is supported in such a way as to leave a clear space for this purpose. Once past the sprocket the chain goes in the usual way into the return run and each pivot pulls its respective flight in the trailing position in the return run.

BRIEF DESCRIPTION OF THE DRAWINGS

One form of conveyor made according to the present invention will now be described with reference to the accompanying drawings wherein:

FIG. 4 is a plan view of the delivery end with motor, gearbox and top casing removed, FIG. 5 is a perspective view from above of two sections of the conveyor, partially dismantled, FIG. 6 is a cross section on the line III—III of FIG. 1, and FIG. 7 shows a scraper plate which can be used with the present invention.

DESCRIPTION OF THE PREFERRED EMBODIMENT

Figure 1:
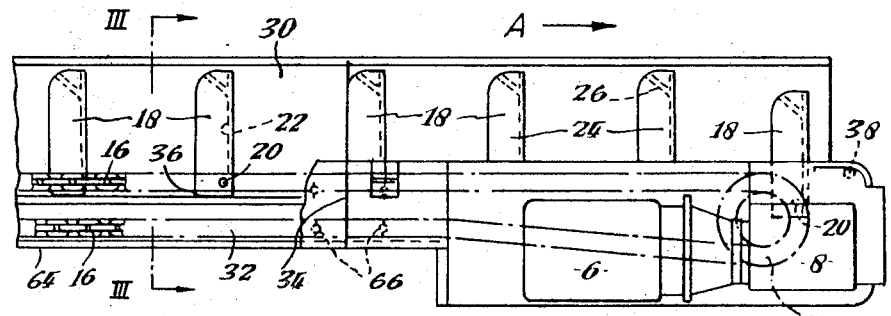
FIG. 1 is a general plan view of the delivery end of the conveyor.
Figure 2:
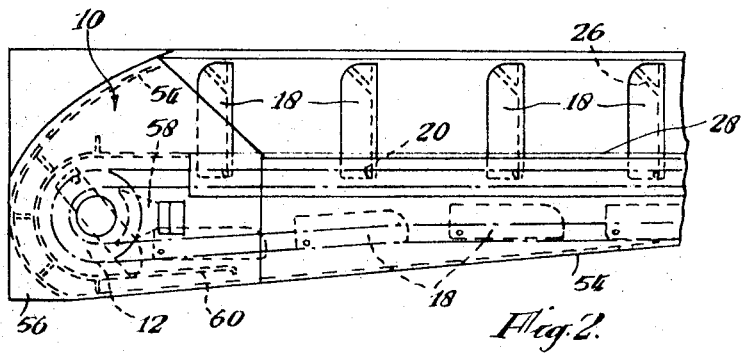
FIG. 2 is a general plan view of the return end of the conveyor.

The conveyor shown in the drawings comprises at its delivery end a terminal section 2 carrying a driving sprocket 4 driven by a motor 6 through reduction gear 8 above the sprocket. The motor 6 and reduction gear 8 are not illustrated and can be of any suitable type, it being noted, however, that the shaft of the driving sprocket 4 leads upwardly from the sprocket and is journalled in bearings within the casing 8; there is no shaft below the sprocket and this leaves a free space within which the flights may move, as will be seen later. At the return end of the conveyor there is a terminal section 10 and this carries a tension sprocket 12, again journalled above the sprocket to leave a clear space below for the movement of the flights. Between the terminal sections 2 and 10 are a series of straight intermediate sections 14 to make up the conveyor to its required length.

The material to be moved by the conveyor is heaped onto a trough 30 which extends the length of the conveyor and along which the material is moved in the direction of the arrow A shown in FIG. 1 by a series of flights 18 pivoted to the chain 16 (shown partly in dot-dash lines in FIG. 1). In its return path the chain and the flights pass along a return channel 32. A cover plate 34 covers the return channel 32 and has at one side a depending side wall 35 to screen a side region of the trough 30 within which the driving run of the chain 16 is located.

Each flight 18 has a flat upper surface 24 and rests on a depending front wall 22 and a rearwardly directed ridge 26. The ridge enables the flights to ride more easily over the junctions 33 between the trough sections.

At intervals along the chain links of the chain are provided with pivot pins 20 extending downwardly therefrom and onto which the leading inner end of the flight is journalled. Each flight has at its inner end a trailing portion 36 which, during the conveying run, bears upon the inner side wall 28 of the trough 30 thereby maintaining the flight transversely to the trough during the conveying run. The wall 28 terminates just short of the rotational axis of the sprocket as best seen in FIG. 4. As the trailing portion 36 of each flight 18 leaves the side wall 28 there is nothing to prevent the flight 18 rotating round its pivot pin 20. In fact, in practice, the flight will be pushing along a heap of coal or other material, and this will check further forward movement of the body of the flight within the trough 30; meanwhile the pivot pin 20 is being carried round the driving sprocket 4 with the chain and this pulls the flight 18 sideways out of the path of the coal more or less along its own length, so that the flight actually passes underneath the driving sprocket 4. By thus slipping sideways out of the material being conveyed there is little tendency for the material to adhere to the surfaces of the flight. Although, as stated, the flights will almost certainly be withdrawn under the sprocket 4 by reason of the conveyed material causing counter clockwise movement around the pivot pins 20, a static pin 38 may be provided at the end of the driving run against which the flights 18 may strike, if for any reason they fail to rotate in this manner, perhaps because the conveyor is running empty.

Even though the movement of the flight itself militates against material adhering to its surfaces, it is quite possible, and indeed desirable, to clean the flat upper surface 34 before it passes under the sprocket 4. This may be done by means of a scraper plate, as more particularly detailed in my copending application, Ser. No. 794,549, filed on Jan. 28, 1969. For the sake of completeness, such a plate is illustrated in FIG. 7 of the drawings, although it does not form any part of the subject matter of this application. As can be seen from FIG. 7, the scraper plate 40 may have its bottom scraping surface 39 tapered downwardly in the direction of movement of the material being conveyed so that the front of the flat upper surface 24 comes into contact with the scraper plate 40 on each occasion whilst the back of the surface 24 is only slightly below the scraper plate. Thus, as each flight is withdrawn, the upper surface 24 is scraped substantially clean of material. As the flights pass into the return run they continue to be pulled in a trailing attitude behind their pivot pins.

By pivoting the flights on pivot pins extending downwardly from the chain 16 the chain is supported above the flights themselves both in the driving run and in the return run. In the return run the flights run end-to-end and there is no possibility of the chain scraping along the base of the return channel 32. In the driving run also the tensioned chain travels above the trough 30 within the casing formed by the cover plate 34 and its side wall 35. It is inevitable that some of the material being conveyed will pass underneath the side wall 35 between the flights, but such small amount of material that does this will be carried forward by the flights. Any of this small material or dust which gets into the links of the chain will tend to be shaken off during the movement of the chain. The construction is much more efficient in this respect from previously proposed constructions where the chain ran along a channel of its own and where there was no possibility of the material which might get into the links of the chain being shaken off back into the trough of the conveyor.

Figure 3:
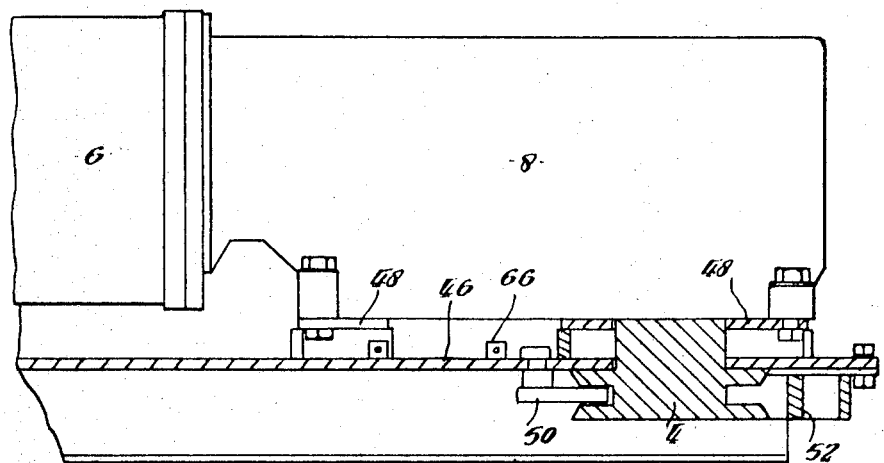
FIG. 3 is a side view of the delivery end partly in section, without the chain or flights.

Further details of the delivery end of the conveyor are shown in FIGS. 3 and 4. A base surface 42, which is at the same level as the surface of the trough 30 and the surface of the return channel 32 is partly bounded by the inner side wall 28 of the conveying trough and by its own outer side wall 44, and on these is positioned a cover plate 46. The cover plate 46 is provided with suitable load bearing blocks 48 on which the motor 6 and reduction gear 8 are mounted by conventional means. On the underside of the cover plate 46 there is bolted a plate 50 having an arcuate surface 51 which fits in between the two flanges of the driving sprocket 4. On the opposite side of the sprocket 4 from the plate 50 is an arcuate guide 52 which extends down level with the bottom of the sprocket 4 through an angle of about 180° just outside the path of movement of the chain. FIG. 4 of the drawings shows the position of a flight 18 which has completed the inward withdrawal away from the trough 30; the pivot 20 has just left the sprocket 4 and the flight 18 has swung round preparatory to being withdrawn by its pivot pin into the return run of the conveyor.

At the return end of the conveyor there is an outer side wall 54 on which is located one of a number of cover plates 56 to the underside of which there are positioned a plate 58 similar to the plate 50 at the other end and an outer chain guide 60 equivalent in function to the arcuate guide 52. As each flight reaches the sprocket 12 it is flung outwardly by centrifugal force and the trailing portion 36 makes contact with the wall 28.

The return channel 32 has an inner wall 62 which is contiguous with the inner side wall 28 of the trough and an outer wall 64 which is in line with and joins the outer side walls 44 and 54 at the delivery and return ends respectively. The cover plates 34, 46 and 56 are removably mounted, suitably by means of upstanding pins 66 on the walls immediately below, which pass through corresponding apertures in the cover plates, these being then held in position by split dowels 68 passing through apertures in the pins.

One of the problems with single chain conveyors is that of preventing the flights from lifting above the surface of the trough 30, and this is partly prevented by the side wall 35 which comes down nearly to the level of the flat upper surface 24 of the flights. To reduce wear between the driving chain 16 and the side walls 28 and 35 and also the outer wall 64 of the return channel 32, bearing lugs 70 are provided on each link of the chain which is attached to a pivot pin 20. These bearing lugs extend transversely on each side of the chain link to almost the width between the side walls 28 and 35. Thus the lugs, which may be made of wear-resistant steel, take most or all of the wear, and contact between the chain and the side walls may be virtually eliminated. In the absence of the lugs the chain (which, because of its rounded shape, has only a small area of contact with the side walls) tends to form a score grooved along these walls.

The lugs have the further function of sweeping free from extraneous material the side walls 28, 35. If any of the material being conveyed gets heaped up against the inside of the side wall 35 and against the side wall 28 it will be scraped away by the lugs 70. This avoids an inconvenience experienced with some present day two-chain conveyors where the material being conveyed sometimes adheres to the edges of the trough underneath the effective housing for the chains and has to be removed by special scavenging devices fixed to the chain at the beginning of the run and removed at the end of the run before reaching the sprocket.

A rectangular rebate 72 is provided between the upper surface 24 of the flight 18 and each lug 70. A longitudinal tongue 74 is provided along the inside of the wall 28 to engage in the rebate 72 of the adjacent lugs 70 during the conveying run. The tongue 74 has a rectangular cross section and is a close sliding fit within the rebate 72. Thus it will be seen that the bearing lugs 70 in combination with the tongue rebate arrangement assist in guiding the flights on the conveying run and provide additional resistance to lifting of the flights. As shown in FIG. 6 the rebate 72 is provided in both lugs 70 of the link. This is not an essential feature, but is merely to make the bearing lugs symmetrical so that they cannot be inadvertently positioned the wrong way round during assembly of the conveyor. Also it permits if desired provision of a further longitudinal tongue on the side wall 35 or the side wall 64.

What I claim and desire to secure by Letters Patent is:

1. A scraper chain conveyor comprising a trough to receive the material being moved, an endless chain one run of which lies in a side region of the trough, a series of pivot pins on the chain and extending downwardly therefrom, a series of flights spaced along the chain and each pivotally attached at one end to a respective one of the pivot pins so that part of the flight at said end lies directly beneath the chain, and having at that end a trailing portion to bear against a wall of the trough and so maintain the flight transversely to the trough throughout the driving run of the chain, a cover for the side region of the trough, a downwardly extending side wall on the cover lying between the main region of the trough and the chain, this side wall providing an abutment for the flights limiting upward pivoting thereof along the driving run of the chain, sprockets for the chain at the delivery end and at the return end of the conveyor, at least the sprocket at the delivery end being supported in such a way as to leave a clear space underneath for the passage of the flights, means enabling the flights to rotate freely about their pins at the completion of each driving run so that each flight is withdrawn sideways by the pivot pin away from the material being delivered by the conveyor, passes under the sprocket and is caused to assume a trailing attitude relative to its pivot during the return run, and a bearing lug of wear-resistant material extending transversely from each link of the chain, these lugs being arranged to be engageable with the side wall of the trough and the said flange during the driving run.

2. In a conveyor of the type comprising a trough to receive the material being conveyed, an endless chain at one side of the trough extending therealong between end sprockets, a series of flights spaced along and below the chain and pivotally attached at one end to the chain, means adapted to maintain the flights transversely to the trough throughout the driving run whereby the working parts of the flights cause the materials to flow along the trough and further adapted to permit rotation of the flights about their pivots at the completion of each driving run so that they assume a trailing attitude relative to their pivots during the return run, the provision on each link of the chain pivotally attached to a flight of a bearing lug of wear-resistant material extending transversely therefrom and arranged to be engageable with the adjacent side wall of the trough during the driving run.

3. A conveyor according to claim 2 wherein the chain is covered throughout the driving run by a protective housing including a depending side wall, each said link of the chain having a second bearing lug of wear-resistant-material extending transversely therefrom and engageable with said depending side wall during the driving run.

4. A conveyor according to claim 2 wherein there is also provided a longitudinal tongue extending along the inside surface of said side wall of the trough and slidably engageable in a corresponding rebate formed in each adjacent bearing lug.

References Cited
UNITED STATES PATENTS

| | | | |
|---|---|---|---|
| 2,916,130 | 12/1959 | Piemont | 198—170 X |
| 3,472,556 | 10/1969 | Bolton | 198—170 X |

EDWARD SROKA, Primary Examiner

U.S. Cl. X.R.

198—171